United States Patent
Fujiki et al.

(10) Patent No.: US 6,831,127 B2
(45) Date of Patent: Dec. 14, 2004

(54) NON-STAINING SILICONE RUBBER COMPOSITIONS

(75) Inventors: Hironao Fujiki, Gunma-ken (JP); Tsuneo Kimura, Gunma-ken (JP); Tadashi Araki, Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 10/268,981

(22) Filed: Oct. 11, 2002

(65) Prior Publication Data

US 2003/0092830 A1 May 15, 2003

(30) Foreign Application Priority Data

Oct. 11, 2001 (JP) .............................. 2001-313644

(51) Int. Cl.$^7$ .......................... C08L 83/06; C08L 83/07
(52) U.S. Cl. ................ 524/588; 524/425; 524/492; 523/209; 523/212; 528/34
(58) Field of Search ................ 528/34; 524/425, 524/492, 588; 523/209, 212

(56) References Cited

U.S. PATENT DOCUMENTS

| | | | | |
|---|---|---|---|---|
| 3,694,427 A | * | 9/1972 | Jonas et al. | 528/18 |
| 4,360,610 A | * | 11/1982 | Murray et al. | 523/212 |
| 4,555,560 A | * | 11/1985 | Saruyama et al. | 528/17 |
| 4,558,109 A | | 12/1985 | McAfee | |
| 4,749,824 A | * | 6/1988 | Orbeck | 174/179 |
| 5,194,479 A | * | 3/1993 | Takahashi et al. | 524/401 |
| 5,633,311 A | * | 5/1997 | Yamamoto et al. | 528/14 |
| 5,854,310 A | * | 12/1998 | Maxson | 528/213 |
| 5,960,245 A | | 9/1999 | Chen et al. | |
| 6,107,381 A | * | 8/2000 | Stein et al. | 524/265 |
| 6,265,516 B1 | * | 7/2001 | Okawa et al. | 528/26 |

FOREIGN PATENT DOCUMENTS

| | | |
|---|---|---|
| EP | 0 787 773 A2 | 8/1997 |
| JP | 9-227779 A | 9/1997 |

* cited by examiner

*Primary Examiner*—Jeffrey B. Robertson
(74) *Attorney, Agent, or Firm*—Birch, Stewart, Kolasch & Birch, LLP

(57) ABSTRACT

In a silicone rubber composition of the condensation curing type comprising a diorganopolysiloxane having at least two silicon-attached hydroxyl or hydrolyzable radicals as a base polymer, and a silane having at least two hydrolyzable radicals or a partial hydrolytic condensate thereof, at least 2 mol % of the entire substituent radicals attached to silicon atoms in the diorganopolysiloxane are monovalent hydrocarbon radicals having at least two carbon atoms. The cured composition has excellent non-staining and sealing properties, and when applied as a coating, filled into joints, or used as a solid gasket, it does not cause staining of the building, joints, or the area around joints.

12 Claims, No Drawings

NON-STAINING SILICONE RUBBER COMPOSITIONS

This nonprovisional application claims priority under 35 U.S.C. §119(a) on Patent Application No. 2001-313644 filed in JAPAN on Oct. 11, 2001, which is herein incorporated by reference.

BACKGROUND OF THE INVENTION

1. Field of the Invention

This invention relates to non-staining silicone rubber compositions for use as rubber construction materials such as sealants, coatings and gaskets.

2. Prior Art

Synthetic rubber sealants are commonly used to fill concrete joints, joints in window and door sashes, and around the edge of glass panels in buildings and other structures. A variety of such sealants are known, including silicone, polysulfide, polyurethane, acrylic rubber, styrene-butadiene rubber (SBR) and butyl rubber sealants. Of these, condensation-curing silicone sealants are widely used on account of their adhesive properties, heat and weather resistance, and durability. Solid gaskets used in construction are often made of peroxide-vulcanized silicone. In addition, techniques have recently been disclosed for overcoating peroxide-vulcanized silicone gaskets with a UV-curable silicone coating, and for fabricating gaskets integral to glass by placing a mold over the glass, pouring a platinum-catalyzed addition-curing silicone rubber composition into the mold, then curing the composition and bonding it to the glass.

However, one problem associated with the silicone sealants and gaskets used until now in exterior wall joints has been the spread of stains near the joints. This depends to a large extent on the site conditions (external environment, orientation) of the building and the joint design (shape, adhesion substrate), and has generally been found to correlate closely with the degree of air pollution around the building, the manner in which rainwater flows down over the building, and the degree of dryness after a rainfall. Solutions to prevent staining include changing the design of the joint to one which does not come into direct contact with rain, such as a hidden joint or a recessed joint, and using a coating to create a barrier on the surface of the sealant after it has cured or on the surface of the gasket. The former approach entails changes in the design specifications, leaving problems to be resolved with the decorative details of the building, whereas the latter approach requires the addition of a coating operation that increases overall construction costs. For these reasons, neither approach is in common use today.

We earlier disclosed that, when a rubber construction material such as a sealant, coating or gasket is made of the cured form of a silicone rubber composition containing dispersed particles having a photocatalytic activity, such as titanium oxide or zinc oxide, exposure to ultraviolet light modifies the surface, rendering it hydrophilic and non-staining (JP-A 9-227779). Yet, although this method marked a significant improvement in non-staining ability over other prior-art silicone sealants, there exists a need for better non-staining properties.

SUMMARY OF THE INVENTION

It is therefore an object of the present invention to provide silicone rubber compositions which have excellent non-staining properties.

We have found that silicone rubber compositions of the condensation curing type are significantly improved in non-staining properties by using as a base polymer a diorganopolysiloxane in which at least 2 mol % of the entire substituent radicals directly attached to silicon atoms are substituted or unsubstituted monovalent hydrocarbon radicals having at least two carbon atoms.

Accordingly, the invention provides a non-staining silicone rubber composition of the condensation curing type comprising a diorganopolysiloxane having at least two hydroxyl or hydrolyzable radicals each attached to a silicon atom per molecule as a base polymer, and a silane having at least two hydrolyzable radicals per molecule or a partial hydrolytic condensate thereof, wherein at least 2 mol % of the entire substituent radicals attached to silicon atoms in the diorganopolysiloxane are substituted or unsubstituted monovalent hydrocarbon radicals having at least two carbon atoms.

DESCRIPTION OF THE PREFERRED EMBODIMENT

The non-staining silicone rubber composition of the invention contains a diorganopolysiloxane as the main component or base polymer and is cured through the condensation curing mechanism.

The diorganopolysiloxane used herein should have at least two hydroxyl or hydrolyzable radicals each directly attached to a silicon atom per molecule in order for the siloxane to cure through condensation reaction, and substituent radicals attached to silicon atoms, at least 2 mol % of which are substituted or unsubstituted monovalent hydrocarbon radicals having at least two carbon atoms.

In conventional base polymers used in condensation curing silicone rubber (or RTV) compositions, most of substituent radicals other than the hydroxyl or hydrolyzable radicals participating in condensation reaction are methyl. By contrast, in the inventive base polymer, a specific quantity of substituted or unsubstituted monovalent hydrocarbon radicals having at least two carbon atoms, which do not participate in condensation or crosslinking reaction, are introduced into the substituent radicals other than the hydrolyzable radicals, for thereby significantly improving non-staining properties.

The diorganopolysiloxane is substantially linear, but may be branched to some extent as long as gelation does not occur or rubber elasticity is not compromised. The degree of branching is usually up to 10 mol %, preferably up to 5 mol %.

Preferred diorganopolysiloxanes have the following general formula (1) or (2).

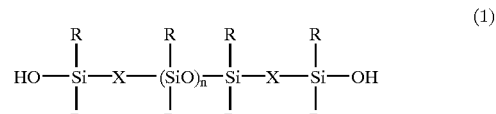

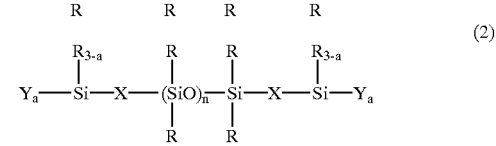

Herein R is a substituted or unsubstituted monovalent hydrocarbon radical, and at least 2 mol % of R are substituted or unsubstituted monovalent hydrocarbon radicals having at least two carbon atoms; X is an oxygen atom or a divalent hydrocarbon radical having 1 to 8 carbon atoms; Y is a hydrolyzable radical; n is such a number that the diorgnopolysiloxane has a viscosity of 100 to 1,000,000 cs at 25° C.; and "a" is 2 or 3.

More illustratively, R is independently selected from substituted or unsubstituted monovalent hydrocarbon radicals, preferably having 1 to 12 carbon atoms, more preferably 1 to 10 carbon atoms. Examples include alkyl radicals such as methyl, ethyl, propyl, butyl, 2-ethylbutyl and octyl; cycloalkyl radicals such as cyclohexyl and cyclopentyl; alkenyl radicals such as vinyl, propenyl, butenyl, heptenyl, hexenyl, and allyl; aryl radicals such as phenyl, tolyl, xylyl, naphthyl and diphenyl; aralkyl radicals such as benzyl and phenylethyl; and substituted ones of the foregoing radicals in which some or all of the carbon-bonded hydrogen atoms are substituted with halogen atoms, cyano or other radicals, such as chloromethyl, trifluoropropyl, 2-cyanoethyl and 3-cyanopropyl.

At least 2 mol %, preferably at least 2.5 mol % of R should be substituted or unsubstituted monovalent hydrocarbon radicals having at least two carbon atoms. The upper limit is not critical, but is usually up to 50 mol % for ease of synthesis. The substituted or unsubstituted monovalent hydrocarbon radicals having at least two carbon atoms include the same monovalent hydrocarbon radicals as described for R, but excluding methyl. Preferred examples are alkenyl radicals such as vinyl, allyl, propenyl, butenyl, heptenyl and hexenyl, as well as ethyl, propyl and phenyl. Of these, the alkenyl radicals are more preferred, with vinyl being most preferred.

The substituent radicals represented by R other than the monovalent hydrocarbon radicals having at least two carbon atoms are preferably methyl.

X is an oxygen (O) atom or a divalent hydrocarbon radical having 1 to 8 carbon atoms which is represented by —$(CH_2)_m$— wherein m is 1 to 8. X is preferably an oxygen atom or —$CH_2CH_2$—.

The subscript n is such a number that the diorgnopolysiloxane has a viscosity of 100 to 1,000,000 cs at 25° C., preferably 500 to 500,000 cs at 25° C.

Y is a hydrolyzable radical, examples of which include alkoxy radicals such as methoxy, ethoxy, propoxy and butoxy, ketoxime radicals such as dimethyl ketoxime and methyl ethyl ketoxime, acyloxy radicals such as acetoxy, and alkenyloxy radicals such as isopropenyloxy and isobutenyloxy.

These diorganopolysiloxanes can be prepared by well-known methods, for example, by effecting equilibration reaction of a cyclic siloxane or linear oligomer serving as a monomer to various organopolysiloxanes, in the presence of an acid or base catalyst.

Where it is desired to introduce a branch structure into the diorganopolysiloxane, one common practice is to add a silane or siloxane containing $SiO_{3/2}$ and/or $SiO_{4/2}$ units during the equilibration polymerization at such a level that the diorganopolysiloxane may not gel. It is desired that low-molecular-weight siloxanes be removed from the diorganopolysiloxane as by stripping or solvent washing. Use of such refined diorganopolysiloxane is effective in reducing initial staining.

A crosslinking agent is often used in the inventive composition. A silane having at least two, preferably at least three hydrolyzable radicals per molecule or a partial hydrolytic condensate thereof is typically used as the crosslinking agent. Illustrative examples of the hydrolyzable radicals include alkoxy radicals (e.g., methoxy, ethoxy, butoxy), ketoxime radicals (e.g., dimethyl ketoxime, methyl ethyl ketoxime), acyloxy radicals (e.g., acetoxy), alkenyloxy radicals (e.g., isopropenyloxy, isobutenyloxy), amino radicals (e.g., N-butylamino, N,N-diethylamino), and amide radicals (e.g., N-methyl-acetamide). Of these, alkoxy, ketoxime, acyloxy and alkenyloxy radicals are preferred.

The crosslinking agent is typically included in an amount of 1 to 50 parts, preferably 2 to 30 parts, and more preferably 5 to 20 parts, per 100 parts of the diorganopolysiloxane. Unless noted otherwise, all parts here and below are by weight.

A curing catalyst is typically used in the inventive silicone rubber composition. Illustrative examples of suitable curing catalysts include alkyltin ester compounds such as dibutyltin diacetate, dibutyltin dilaurate and dibutyltin dioctoate; titanic acid ester or titanium chelate compounds such as tetraisopropoxytitanium, tetra-n-butoxytitanium, tetrakis(2-ethylhexoxy)titanium, dipropoxybis(acetylacetonato) titanium and titanium isopropoxyoctylene glycol; organometallic compounds such as zinc naphthenate, zinc stearate, zinc 2-ethyloctoate, iron 2-ethylhexoate, cobalt 2-ethylhexoate, manganese 2-ethylhexoate, cobalt naphthenate and alkoxyaluminum compounds; aminoalkyl-substituted alkoxysilanes such as 3-aminopropyltriethoxysilane and N-β-(aminoethyl)-γ-aminopropyltrimethoxysilane; amine compounds and their salts, such as hexylamine and dodecylamine phosphate; quaternary ammonium salts such as benzyltriethylammonium acetate; alkali metal salts of lower fatty acids, such as potassium acetate, sodium acetate and lithium oxalate; dialkylhydroxylamines such as dimethylhydroxylamine and diethylhydroxylamine; and guanidyl-bearing silanes or siloxanes, such as tetramethylguanidylpropyltrimethoxysilane, tetramethylguanidylpropylmethyldimethoxysilane and tetramethylguanidylpropyltris(trimethylsiloxy) silane. These catalysts may be used alone or in admixture of two or more.

The curing catalyst is typically included within the composition in an amount of 0 to 20 parts, preferably 0.001 to 10 parts, and more preferably 0.01 to 5 parts, per 100 parts of the diorganopolysiloxane.

In addition to the above-mentioned components, the silicone rubber composition of the invention may optionally include one or more filler for reinforcement or some other purpose. Examples of suitable fillers include reinforcements such as fumed silica, precipitated silica and other silicas, which may be surface treated with organosilicon compounds to be hydrophobic, quartz powder, carbon black, talc, zeolite and bentonite; fibrous fillers such as asbestos, glass fibers, carbon fibers and organic fibers; basic fillers such as calcium carbonate, zinc carbonate, zinc oxide, magnesium oxide and zeolite; and photocatalytic fillers such as titanium oxide. Of these fillers, silica, calcium carbonate and zeolite are preferred. Fumed silica surface treated to be hydrophobic and calcium carbonate are especially preferred.

The amount of the filler blended may be determined in accordance with a particular purpose and the type of filler, but is preferably 1 to 500 parts, especially 5 to 100 parts per 100 parts of the diorganopolysiloxane.

Various other compounds may be added to the silicone rubber composition of the invention as long as such addition does not compromise the non-staining properties of the composition. Examples of additional compounds include thixotropic agents such as polyethylene glycol or derivatives thereof, heat resistance enhancers such as red iron oxide and cerium oxide, freeze resistance enhancers, dehydrating agents, rust inhibitors, adhesion improving agents such as γ-aminopropyltriethoxysilane, and liquid reinforcing agents such as network polysiloxane composed of triorganosiloxy units and $SiO_2$ units and/or monoorganosiloxy units.

Photocurable substances (e.g., oligomers and polymers bearing unsaturated radicals such as acrylic radicals) and photodegradable substances (e.g., tung oil, linseed oil) used in the art may also be added for the purpose of improving the non-staining properties, provided such addition does not compromise the objects of the invention.

The non-staining silicone rubber composition of the invention may be obtained by mixing predetermined amounts of the above-described components in a mixer such as a kneader/mixer, planetary mixer or Shinagawa mixer.

The non-staining silicone rubber composition of the invention can, through curing, be used as rubber construction materials such as sealants, coatings and gaskets.

The non-staining silicone rubber composition of the invention cures with moisture at room temperature. The composition may be molded and cured using known methods and under known conditions that are appropriate for the particular type of composition.

The silicone rubber composition of the invention in the cured state, i.e., silicone rubber has excellent non-staining properties and sealing properties. As a result, when applied as coatings, filled into joints, or used as solid gaskets, the silicone rubber does not cause staining of the building, joints or the area around joints. The silicone rubber itself is resistant to staining and has excellent weather resistance.

EXAMPLE

Synthesis Examples, Examples and Comparative Examples are given below for further illustrating the invention, but the invention is not limited thereto. The viscosities indicated below are the values measured at 25° C.

Synthesis Example 1
Preparation of Polymer A

A 5-liter three-necked flask equipped with a thermometer, stirrer and condenser was charged with 2,752 g of 2,4,6,8-tetravinyl-2,4,6,8-tetramethylcyclotetrasiloxane, 1.8 g of distilled water, and 0.08 g of potassium hydroxide and heated at 150° C. for 5 hours for reaction to take place. At the end of reaction, the reaction solution was cooled to 80° C., combined with 4.0 g of ethylene chlorohydrin, and held at 80° C. for 3 hours for further reaction to take place. By heating in vacuum, low volatiles were distilled off. There was obtained 2,400 g of a colorless clear liquid having a viscosity of 100,000 mPa·s and a non-volatile content of 95.8% (polymethylvinylsiloxane capped with a hydroxyl radical at either end, the proportion of substituent radicals of at least 2 carbon atoms based on the entire silicon-attached substituent radicals: 50 mol %).

Synthesis Example 2
Preparation of Polymer B

The procedure of Synthesis Example 1 was repeated except that 1,376 g of 2,4,6,8-tetravinyl-2,4,6,8-tetramethylcyclotetrasiloxane and 1,184 g of octamethylcyclotetrasiloxane were used instead of 2,752 g of 2,4,6,8-tetravinyl-2,4,6,8-tetramethylcyclotetrasiloxane. There was obtained 2,300 g of a colorless clear liquid having a viscosity of 62,000 mPa·s and a non-volatile content of 96.8% (polymethylvinylsiloxane capped with a hydroxyl radical at either end, the proportion of substituent radicals of at least 2 carbon atoms based on the entire silicon-attached substituent radicals: 25 mol %).

Synthesis Example 3
Preparation of Polymer C

The procedure of Synthesis Example 1 was repeated except that 688 g of 2,4,6,8-tetravinyl-2,4,6,8-tetramethylcyclotetrasiloxane and 1,776 g of octamethylcyclotetrasiloxane were used instead of 2,752 g of 2,4,6,8-tetravinyl-2,4,6,8-tetramethylcyclotetrasiloxane. There was obtained 2,250 g of a colorless clear liquid having a viscosity of 50,000 mPa·s and a non-volatile content of 96.6% (polymethylvinylsiloxane capped with a hydroxyl radical at either end, the proportion of substituent radicals of at least 2 carbon atoms based on the entire silicon-attached substituent radicals: 12.5 mol %).

Synthesis Example 4
Preparation of Polymer D

The procedure of Synthesis Example 1 was repeated except that 275 g of 2,4,6,8-tetravinyl-2,4,6,8-tetramethylcyclotetrasiloxane and 2,131 g of octamethylcyclotetrasiloxane were used instead of 2,752 g of 2,4,6,8-tetravinyl-2,4,6,8-tetramethylcyclotetrasiloxane. There was obtained 2,100 g of a colorless clear liquid having a viscosity of 80,000 mPa·s and a non-volatile content of 95.7% (polymethylvinylsiloxane capped with a hydroxyl radical at either end, the proportion of substituent radicals of at least 2 carbon atoms based on the entire silicon-attached substituent radicals: 5 mol %).

Synthesis Example 5
Preparation of Polymer E

The procedure of Synthesis Example 1 was repeated except that 138 g of 2,4,6,8-tetravinyl-2,4,6,8-tetramethylcyclotetrasiloxane and 2,250 g of octamethylcyclotetrasiloxane were used instead of 2,752 g of 2,4,6,8-tetravinyl-2,4,6,8-tetramethylcyclotetrasiloxane. There was obtained 2,150 g of a colorless clear liquid having a viscosity of 150,000 mPa·s and a non-volatile content of 99.2% (polymethylvinylsiloxane capped with a hydroxyl radical at either end, the proportion of substituent radicals of at least 2 carbon atoms based on the entire silicon-attached substituent radicals: 2.5 mol %).

Synthesis Example 6
Preparation of Polymer F

The procedure of Synthesis Example 1 was repeated except that 2,368 g of octamethylcyclotetrasiloxane was used instead of 2,752 g of 2,4,6,8-tetravinyl-2,4,6,8-tetramethylcyclotetrasiloxane. There was obtained 2,100 g of a colorless clear liquid having a viscosity of 81,000 mPa·s and a non-volatile content of 96.3% (polymethylvinylsiloxane capped with a hydroxyl radical at either end, the proportion of substituent radicals of at least 2 carbon atoms based on the entire silicon-attached substituent radicals: 0 mol %).

Synthesis Example 7
Preparation of Polymer G

A 2-liter three-necked flask equipped with a thermometer, stirrer and condenser was charged with 1,000 g of Polymer A and 76 g of tetramethoxysilane and heated at 120° C. for 24 hours for reaction to take place. At the end of reaction, methanol and excess tetramethoxysilane were distilled off by heating in vacuum. There was obtained 975 g of a colorless clear liquid having a viscosity of 108,000 mPa·s and a non-volatile content of 96.3% (polymethylvinylsiloxane capped with a trimethoxy radical at either end, the proportion of substituent radicals of at least 2 carbon atoms based on the entire silicon-attached substituent radicals: 50 mol %).

Synthesis Example 8
Preparation of Polymer H

The procedure of Synthesis Example 7 was repeated except that Polymer F was used instead of Polymer A. There was obtained 950 g of a colorless clear liquid having a viscosity of 90,000 mPa·s and a non-volatile content of 98.2% (polymethylvinylsiloxane capped with a trimethoxy radical at either end, the proportion of substituent radicals of at least 2 carbon atoms based on the entire silicon-attached substituent radicals: 0 mol %).

Example 1

A composition was prepared by uniformly mixing 100 parts by weight of Polymer A with 5 parts by weight of dry silica surface treated with dimethyldichlorosilane (Aerosil R972, Nippon Aerosil Co., Ltd.) and further mixing it in vacuum with 6 parts by weight of vinyltrismethylethyl-ketoximesilane and 0.05 part by weight of dibutyltin dioctoate until uniform.

Example 2

A composition was prepared as in Example 1, aside from using Polymer B instead of Polymer A.

Example 3

A composition was prepared as in Example 1, aside from using Polymer C instead of Polymer A.

Example 4

A composition was prepared as in Example 1, aside from using Polymer D instead of Polymer A.

Example 5

A composition was prepared as in Example 1, aside from using Polymer E instead of Polymer A.

Example 6

A composition was prepared by uniformly mixing 100 parts by weight of Polymer A with 50 parts by weight of colloidal calcium carbonate and further mixing it in vacuum with 8 parts by weight of vinyltrisisopropenoxysilane and 1.0 part by weight of tetramethylguanidylpropyltrimethoxysilane until uniform.

Example 7

A composition was prepared by uniformly mixing 100 parts by weight of Polymer G with 50 parts by weight of colloidal calcium carbonate and further mixing it in vacuum with 6 parts by weight of methyltrimethoxysilane and 1.0 part by weight of tetrabutyl titanate until uniform.

Comparative Example 1

A composition was prepared as in Example 1, aside from using Polymer F instead of Polymer A.

Comparative Example 2

A composition was prepared as in Example 6, aside from using Polymer F instead of Polymer A.

Comparative Example 3

A composition was prepared as in Example 7, aside from using Polymer H instead of Polymer G.

Each of these organopolysiloxane compositions was applied to a colorless glass plate over an area of 30×30 mm and to a thickness of 2 mm, then held for 7 days in a 20° C., 55% relative humidity atmosphere to form a rubber elastomer. The resulting elastomers were then subjected to two years of outdoor exposure. Resistance to staining under outdoor exposure was examined, with the results shown in Table 1 below.

TABLE 1

| | Resistance to staining under outdoor exposure | | |
|---|---|---|---|
| | Initial | After 1 yr | After 2 yrs |
| Example 1 | Good | Good | Good |
| Example 2 | Good | Good | Good |
| Example 3 | Good | Good | Good |
| Example 4 | Good | Good | Good |
| Example 5 | Good | Good | Good |
| Example 6 | Good | Good | Good |
| Example 7 | Good | Good | Good |
| Comparative Example 1 | Good | Stained | Stained |
| Comparative Example 2 | Good | Stained | Stained |
| Comparative Example 3 | Good | Stained | Stained |

Japanese Patent Application No. 2001-313644 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

What is claimed is:

1. A non-staining silcone rubber composition of the condensation curing type consisting essentially of 100 parts by weight of a diorganopolysiloxane of the general formula (2) as a base polymer, 1 to 50 parts by weight of a silane having at least two hydrolyzable radicals per molecule or a partia hydrolytic condensate thereof, 0.001 to 20 parts by weight of a curing catalyst, and 1 to 500 parts by weight of a filler:

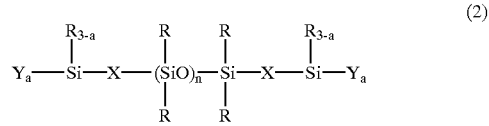

wherein Y is a hydrolysable radical, at least 2 mol % of R are aliphatic unsaturated radicals and the remaining radicals represented by R are methyl, "a" is 2 or 3, X is an oxygen atom or a divalent hydrocarbon radical having 1 to 8 carbon atoms, and n is such a number that the diorganopolsiloxane has a viscosity of 100 to 1,0001000 cs at 250C.

2. The non-staining silicone rubber composition of claim 1, further comprising a filler selected from calcium carbonate and silica which has been surface treated to be hydrophobic.

3. The non-staining silcone rubber composition of claim 1, wherein the at least 2 mol % of R is a substituted or unsubstituted monovalent hydrocarbon on radical having 2 to 12 carbon atoms.

4. The non-staining silicone rubber composition of claim 1, wherein the at least 2 mol % of R is a substituted or unsubstituted monovalent hydrocarbon on radical having 2 to 10 carbon atoms.

5. The non-staining silicone rubber composition of claim 1, wherein at least 2.5 mol % of R are substituted or unsubstituted monovalent hydrocarbon radicals having at least two carbon atoms.

6. The non-staining silicone rubber composition of claim 1, wherein Y is selected from the group consisting of alkoxy radicals, ketoxime radicals, acyloxyl radicals, and alkenyloxy radicals.

7. The non-staining silicone rubber composition of claim 1, wherein Y is selected from the group consisting of methoxy, ethoxy, propoxy, butox, dimethyl ketoxime, methyl ethyl ketoxime, acetoxy, isopropenyloxy, and isobutenyloxy.

8. The non-staining silicone rubber composition of claim 1, wherein the at least 2 mol % of R is a substituted or unsubstituted monovalent hydrocarbon radical having 2 to 10 carbon atoms; and wherein Y is selected from the group consisting of methoxy, ethoxy, propoxy, butoxy, dimethyl ketoxime, methyl ethyl ketoxim, acetoxy, isopropenyloxy, and isobutenyloxy.

9. A method of preventing a silicone rubber from staining under outdoor exposure, said method comprising curing a product of a non-staining silicone rubber composition of the condensation curing type consisting essentially of 100 parts by weight of a diorganopolysiloxane of the following general formula (1) or (2) as a base polymer, 1 to 50 parts by weight of a silane having at least two hydrolysable radicals per molecule or a partial hydrolytic condensate thereof, 0.001 to 20 parts by weight of a curing catalyst, and 1 to 500 parts by weight of a fller:

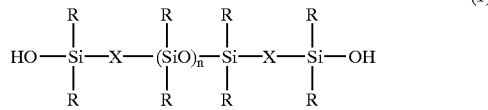
(1)

wherein R is a substituted or unsubstituted monovalent hydrocarbon radical, at least 2 mol % of R are aliphatic unsaturated radicals and the remaining radicals represented by R are methyl, X is an oxygen atom or a divalent hydrocarbon radical having 1 to 8 carbon atoms, and n is such a number that the diorganopolysiloxane has a viscosity of 100 to 1,000,000 cs at 25°C.,

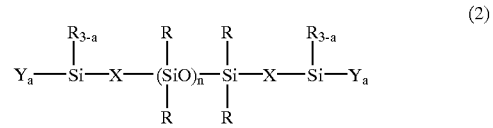
(2)

wherein Y is a hydrolysable radical, "a" is 2 or 3, R, X, and n are as defined above.

10. The method of claim 9, wherein the base polymer is a diorganopolysiloxane of the following general formula (1) or (2):

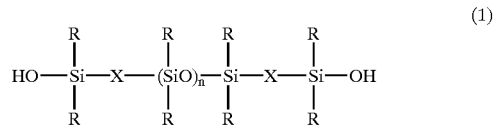
(1)

wherein R is a substituted or unsubstituted monovalent hydrocarbon radical, at least 2 mol % of R are substituted or unsubstituted monovalent hydrocarbon radicals having at least two carbon atoms, X is an oxygen atom or a divalent hydrocarbon radical having 1 to 8 carbon atoms, and n is such a number that the diorganopolysiloxane has a viscosity of 100 to 1,000,000 cs at 25°C.,

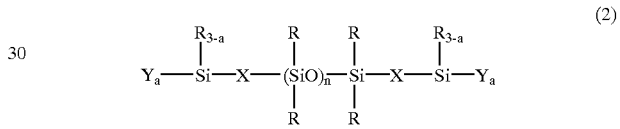
(2)

wherein Y is a hydrolyzable radical, "a" is 2 or 3, R, X, and n are as defined above.

11. The method of claim 9, wherein the silicone rubber composition further comprises a filler selected from calcium carbonate and silica which has been surface treated to be hydrophobic.

12. The non-staining silicone rubber composition of claim 1, wherein n is such a number that the diorganopolysiloxane has a viscosity of 500 to 500,000 cs at 25°C.

* * * * *